Aug. 15, 1961     W. H. BRIGGS     2,995,952

ROAD VEHICLE STEERING MECHANISMS

Filed June 16, 1960

Inventor
W. H. Briggs

United States Patent Office 2,995,952
Patented Aug. 15, 1961

2,995,952
ROAD VEHICLE STEERING MECHANISMS
Walter Henry Briggs, Northfield, Birmingham, England, assignor to Burman & Sons Limited, Birmingham, England
Filed June 16, 1960, Ser. No. 36,582
1 Claim. (Cl. 74—507)

This invention relates to road vehicle steering mechanisms of the rack and pinion type in which the pinion is operable by the driver, and the ends of the rack are adapted for connection through linkages to the steerable road wheels.

The invention has for its object to provide an improved construction enabling slackness between the pinion and rack to be readily eliminated.

A construction in accordance with the invention comprises a spindle on which the pinion is formed or secured, and which at a position adjacent to one end of the pinion has formed on it a collar having a periphery of part-spherical shape, the free end of the spindle adjacent to the other side of the pinion being also formed to a part-spherical shape, a seating shaped to correspond with the said collar, and a seating for said free end of the spindle, this latter seating being formed by a piece which is adjustably supported in the pinion housing.

Figure 1:
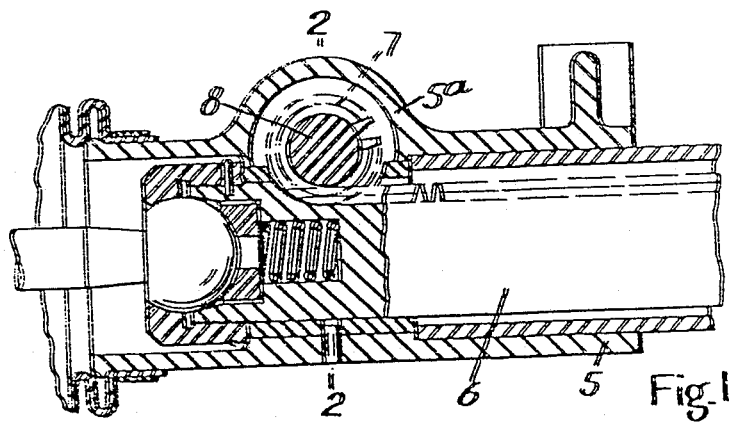
Figure 2:
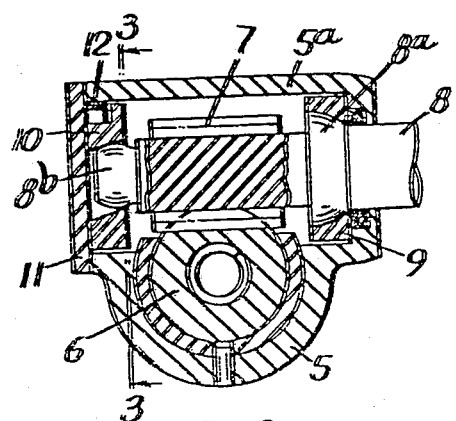
Figure 3:
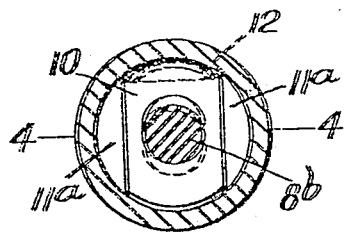
Figure 4:
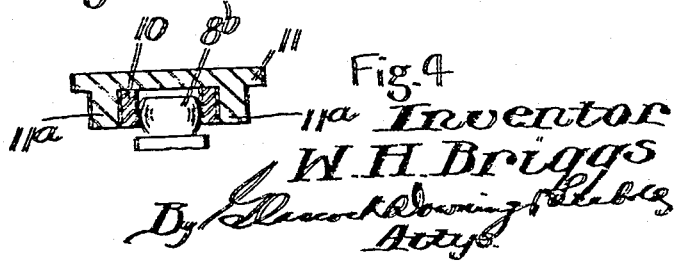

In the accompanying drawings:
FIGURE 1 is a sectional side elevation of an example of the invention,
FIGURE 2 is a section on the line 2—2 of FIGURE 1,
FIGURE 3 is a section on the line 3—3 of FIGURE 2, and
FIGURE 4 is a section on the line 4—4 of FIGURE 3.

Referring to the drawings, the housing 5 which accommodates the rack 6 has combined with it a chambered part 5ᵃ which serves as the housing for the pinion 7. The pinion 7 which co-operates with the rack 6 is formed on, or secured to a spindle 8 which is adapted for actuation by the driver. The spindle 8 extends through one end of the housing, and adjacent to one end of the pinion it has formed on it a collar 8ᵃ the periphery of which is formed to correspond with a zone of a sphere. The collar 8ᵃ is supported in a bearing piece 9 supported in the housing and having an annular bearing surface corresponding to the shape of the collar.

The end 8ᵇ of the spindle adjacent to the other end of the pinion is shaped to spherical zonal form, and is supported in the housing by a separate bearing piece 10. The bearing piece 10 is slidably accommodated between the sectoral parts 11ᵃ of a cover piece 11 attached to the housing so as to be movable laterally relative to the axis of the spindle 8. Moreover, it is urged towards the rack by means of a spring 12, which is shown as being a leaf spring, but could equally well be a coiled compression spring interposed between the bearing piece and the housing.

The hole in the bearing piece 10 which accommodates the end 8ᵇ of the spindle is circular, but has its axis inclined to the spindle axis in such a manner that the action of the spring 12 loading the pinion 7 into engagement with the rack, will serve also to load the spindle 8 axially so as to hold the spherical zone of the collar 8ᵃ against its seating in the bearing piece 9.

Having thus described my invention what I claim as new and desire to secure by Letters Patent is:

Road vehicle steering mechanism of the type specified, comprising in combination a housing, a rack slidably supported within the housing, a pinion engaging the rack, a spindle which is rigid with and extends from the ends of the pinion in coaxial relationship thereto, and which is operable by the driver of the vehicle for causing the pinion to impart movement to the rack, one end of the spindle being of part-spherical shape, and being situated adjacent one end of the pinion, a collar which is formed on the spindle at a position adjacent the other end of the pinion, and which has a periphery of part-spherical shape, a bearing supporting the part-spherical end of the spindle, and slidably mounted within the housing so as to be movable transversely relative to the spindle, a complementary seating against which the part-spherical periphery of the collar bears, and which is provided within the housing, and a spring acting on the bearing in the direction for urging the pinion towards the rack, the bearing being provided with a circular hole which accommodates the part-spherical end of the spindle, and the axis of which is inclined relative to the axis of the spindle so that the spring acting on the bearing serves also to urge the spindle in the axial direction for holding the collar in contact with the complementary seating.

References Cited in the file of this patent

UNITED STATES PATENTS

| | | |
|---|---|---|
| 2,429,696 | Merkt | Oct. 28, 1947 |
| 2,867,284 | Hruska | Jan. 6, 1959 |

FOREIGN PATENTS

| | | |
|---|---|---|
| 416,536 | France | Oct. 22, 1910 |
| 350,369 | Germany | Mar. 17, 1922 |
| 484,216 | Great Britain | May 3, 1938 |
| 655,130 | Great Britain | July 11, 1951 |
| 1,168,537 | France | Dec. 9, 1958 |